April 7, 1942.                M. S. SHAPIRO                    2,279,067
         SYNTHETIC PORCELAIN FOR MAKING ARTIFICIAL
              TEETH AND DENTAL RESTORATIONS
                   Filed Dec. 10, 1940
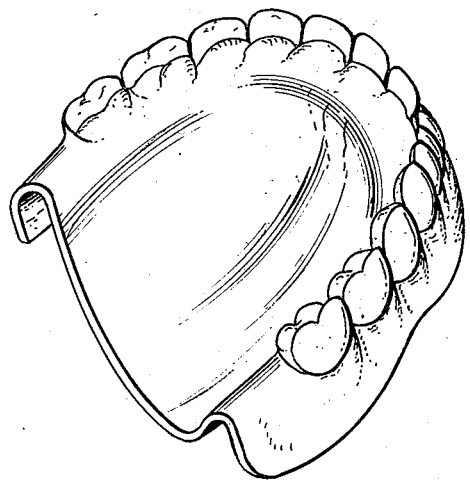
                                              INVENTOR.
                                       Max S. Shapiro
                                   BY  Mock & Blum
                                              ATTORNEY Patented Apr. 7, 1942

2,279,067

UNITED STATES PATENT OFFICE 2,279,067

SYNTHETIC PORCELAIN FOR MAKING ARTIFICIAL TEETH AND DENTAL RESTORATIONS

Max S. Shapiro, Brooklyn, N. Y.

Application December 10, 1940, Serial No. 369,446

8 Claims. (Cl. 32—2)

My invention relates to a synthetic porcelain for making artificial teeth and dental restorations.

My invention relates particularly to a new and improved compound which can be used as a substitute for porcelain, and more specifically as a synthetic porcelain, for making artificial teeth and other dental restorations. The improved compound is particularly useful for making a complete denture, including the teeth of such denture. For example, the improved compound can be used for making a full denture, namely, a full upper and lower plate, including the teeth thereof. The invention is also useful in making all types of dental restorations, such as jacket crowns, facings, inlays, veneer crowns, various forms of bridgework, including the teeth of such bridgework, and for numerous other purposes.

Heretofore, artificial teeth and other porcelain dental restorations have been produced by fusing well-known minerals at a high temperature. In making a denture, the teeth made of the artificial porcelain were connected to a suitable base which was made of vulcanite or Celluloid or other materials, which were different from the materials which were used for making the artificial teeth themselves. It is one of the important purposes of my invention to use substantially the same material for making both the teeth and the base portion of the denture.

I have discovered that I can compound certain silicates and minerals and coloring matter with various materials which can be polymerized under heat and pressure, in order to produce a composition which can be used as a substitute for porcelain in the art of dentistry, thus producing a complete denture, including the teeth. As examples of the materials which I can polymerize under heat and pressure, I refer to the acrylic esters and to the vinyl esters, but the invention is not restricted to these classes of esters.

The annexed drawing is a conventional representation of a denture which is made according to the invention.

In order to illustrate the invention, but without limiting myself to the specific materials or proportions or to the details of manufacture stated in such examples, the following are given:

Example

A typical formula may consist of 60 cc. of liquid or unpolymerized methyl methacrylate monomer (whose specific gravity is 0.94 at 20° C.), 180 grams of solid granulated polymerized methyl methacrylate, 1-2 grams of feldspar, 0.5 gram of silica, 0.5-1 gram of silicon carbide, 1-3 grams of tungsten trioxide, 1-2 grams of oil of cajaput or other oil whose specific gravity is 0.8 or more.

A suitable small percentage of an oil-soluble dye of any color is dissolved in the oil.

The weight of the liquid monomer is 56.40 grams, so that the total weight of the unpolymerized material and of the polymerized material is 236.40 grams.

The minimum total weight of the other ingredients is 4 grams. The feldspar therefore comprises about .4%–8% of the entire composition. The percentage of the other ingredients, with the exception of the pigment, is less than the percentage of the feldspar.

The silica is preferably of the quartz variety, although I can use other types of silicon dioxide. The tungsten trioxide ($WO_3$) is a yellow or yellow-orange powder. The feldspar is preferably of the orthoclase variety, although I can use other varieties of feldspar, including albite. I can also use leucite and natrolite as varieties of feldspar. The feldspar and silica and silicon carbide and the tungsten trioxide should be in very finely divided powdered form.

The method of intermixing and working these ingredients is as follows:

The liquid unpolymerized methyl methacrylate monomer is poured into a vessel which is made of suitable inert material, such as glass and the like. The dye solution in the oil is then intermixed with the liquid monomer, so as to secure a uniform solution. The other ingredients, namely, the feldspar, the silica, the silicon carbide, the tungstic oxide and the granulated polymerized methyl methacrylate are uniformly intermixed so as to produce a homogeneous mixture, in any suitable mixing vessel. This intermixed batch is now added to the liquid monomer in which the oil and dye have already been dissolved, with constant intermixing so as to produce a homogeneous mass. This mass is plastic so that it can be readily shaped. This plastic mass is allowed to stand for a period of five minutes to ten minutes in order to form a putty-like mass. This mass is then set by polymerizing the monomer, in a suitable mold, using heat and pressure. If only a tooth is to be formed, a metal die or mold can be used. If it is desired to make a denture, the mold is made of artificial stone, or of a mixture of artificial stone and plaster of Paris. If the mold is made of artificial stone or of a mixture of plaster of Paris and artificial stone, said mold must be properly tin-foiled. The putty-like composition is packed into the mold, which is heated to a temperature of 180°–240° F., while the material is maintained under a pressure of 500 lbs.–1000 lbs. per square inch. The time of heating at said temperature and pressure is for a period of 30 minutes to 60 minutes.

The function of the feldspar is to give the tooth or denture the required translucence and hardness. The function of the silica is to impart opacity to the composition. Therefore, in making a tooth, the composition is not necessarily uniform. Certain parts of a natural tooth are more opaque than other parts. The composition for making the more opaque parts of the tooth can therefore have silica therein in varying small proportions, and the part of the tooth which is to be substantially translucent may have little or no silica therein. The function of the silicon carbide is to give the artificial tooth grinding power and strength. The tungsten trioxide is a pigment which increases the hardness of the composition and which also imparts a yellowish color tone thereto, in order to simulate a natural tooth.

Likewise, the composition above mentioned may be varied as to color tone or shade, since the base of a denture is usually of a red or pink color. The composition which is used for making the base of the denture may therefore have cadmium red, instead of the tungsten trioxide.

Instead of using methyl methacrylate monomer, I can use other monomers and I can also use polymethacrylic acid. Likewise, I can use a mixture of equal parts by volume of methyl methacrylic monomer and vinyl acetate.

If I mold a tooth form in a metal die or mold, said die or mold should be highly polished and the composition may be heated in said metal die or mold at a pressure of 1000 lbs. per square inch to 3000 lbs. per square inch, at a temperature of 180°–240° F., for a period of 30–90 minutes.

I can also omit the use of the granulated polymerized methyl methacrylate. In such case, this is replaced by a larger volume of the liquid monomer. The mixture thus made is poured or injected into a glass mold whereby it is heated during a period of one to two hours or longer at a temperature of 120°–200° F. under low pressure, which will not exceed the breaking strength of the glass mold. In such case, the weight of the liquid monomer is at least 96% of the weight of the moldable base material. The composition of the final product is the same as if the polymerized ester was used as previously stated.

In order to hasten the polymerization, in any of the examples above mentioned, I can add .005% (five thousandths per cent) of benzoyl peroxide, or any other suitable oxidizing accelerator.

The methyl methacrylate monomer and allied products which can be utilized, are disclosed in various United States patents, such as Nos. 1,980,483, 2,013,295, 2,084,399, 2,086,093, 2,120,006, 2,125,885, 2,160,937, 2,104,168, 2,087,468, 2,073,619, 2,114,233, 2,129,478.

These patents disclose esters of acrylic and methacrylic acids polymerized alone, or polymerized in admixture with each other or with derivatives of these acids, or with other polymerizable substances. These substances also generally include the esters of the alkacrylic acids, such as monomeric acrylates and various alkacrylates. The methyl methacrylate is also designated as acrylic methyl ester. The invention is not limited to esters of alpha methacrylic acid, and it includes the ethyl esters as well as the methyl esters.

Instead of using oil of cajaput, I can use turpentine oil, castor oil, pine-cone oil, and pine-needle oil.

Natural teeth come in many different shadings and there is no fixed rule upon this point. I can simulate the different shadings of natural teeth, and the different shadings of parts of natural teeth, and the different shadings of the base portions of the dentures by using various dyes or pigments, including lakes.

The specific gravity of the heavy oil which I use should not be less than 0.8.

The base part of the denture may consist only of the polymerized ester, with enough feldspar to impart hardness, and a suitable organic dye or inorganic dye or pigment.

In the final complete denture, the polymerized ester is at least 90% by weight of the base and of the tooth or teeth which are integral with said base, and it should be from 90%–96% by weight. The composition of the base and of the tooth or teeth is substantially the same, save for differences in color matter, and differences in minor ingredients, such as silica, silicon carbide, etc.

The polymerized esters previously mentioned have already been used for making denture bases alone, but porcelain teeth were invariably used in conjunction with said bases.

The outstanding feature of my invention is to use the same basic composition for molding the base of the denture and also the tooth or teeth of the denture, in the same molding operation and under the same molding conditions.

Whenever I refer to a dental restoration in a claim, I include a tooth or teeth, and I also include a part of a tooth such as a jacket crown, a veneer crown, a facing, an inlay, etc.

The composition may be used for making teeth or various forms of bridge-work in combination with metal inserts or supports. Therefore, when I claim a dental restoration, the same may be attached to a metal support or abutment, as in bridge-work where the support is made of gold alloy or any other alloy.

I claim:

1. A denture comprising a molded base and a molded tooth or molded teeth which are molded integral with said base, the composition of said base and of said tooth or teeth comprising a major portion of a polymerized acrylic ester, and a minor portion of feldspar.

2. A denture comprising a base and a molded tooth or molded teeth which are molded integral with said base, said base and said tooth or teeth having substantially the same composition, save for different coloring matter, said composition having a major proportion of a polymerized acrylic ester and a minor proportion of feldspar.

3. A denture comprising a base and a molded tooth or molded teeth which are molded integral with said base, said base and said tooth or teeth consisting of at least 90% by weight of a molded polymerized acrylic ester, and a minor proportion of feldspar.

4. A dental restoration whose composition includes a major part by weight of a polymerized acrylic ester, and a minor proportion of mineral grinding and hardening material and a minor proportion of feldspar, said restoration also having coloring matter whereby said restoration simulates the color and translucence of a natural tooth.

5. A denture comprising a molded base and a molded tooth or molded teeth which are molded integral with said base, the composition of said base and of said tooth or teeth comprising a major portion of a polymerized ester, said ester being an ester of an acid which is selected from a class of acids which consists of acrylic and methacrylic acids, said composition having a minor proportion of feldspar.

6. A dental restoration whose composition includes a major part by weight of a polymerized ester, and a minor proportion of feldspar and a minor proportion of mineral grinding and hardening material, said restoration also having coloring matter whereby said restoration simulates the color and translucence of a natural tooth, said ester being an ester of an acid which is selected from a class of acids which consists of acrylic and methacrylic acids.

7. A tooth restoration comprising a molded and polymerized acrylic ester, said restoration containing substantially .4%–.8% of feldspar, said restoration having a minor proportion of coloring matter.

8. A tooth restoration which comprises substantially 98% of a molded and polymerized acrylic ester, substantially .4%–.8% of feldspar, substantially .8% of silica, and substantially .4%–.8% of silicon carbide.

MAX S. SHAPIRO.